United States Patent
Hill

(10) Patent No.: US 8,248,248 B1
(45) Date of Patent: *Aug. 21, 2012

(54) ELECTRONIC TRANSMITTER AND RECEIVER SYSTEM FOR TRAINING OF CATS AND OTHER DOMESTIC ANIMALS AND METHOD OF TRAINING DOMESTIC ANIMALS

(76) Inventor: Patricia J. Hill, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/160,641

(22) Filed: Jun. 15, 2011

Related U.S. Application Data

(63) Continuation of application No. 11/938,244, filed on Nov. 9, 2007, now Pat. No. 7,990,274.

(60) Provisional application No. 60/865,775, filed on Nov. 14, 2006.

(51) Int. Cl.
*G08B 23/00* (2006.01)

(52) U.S. Cl. ............... 340/573.3; 119/719; 119/720; 119/721; 119/859

(58) Field of Classification Search ............... 340/573.3; 119/720–750
See application file for complete search history.

(56) References Cited

U.S. PATENT DOCUMENTS

| 5,815,077 | A  | * | 9/1998  | Christiansen | 340/573.3 |
| 6,019,066 | A  | * | 2/2000  | Taylor       | 119/720   |
| 6,970,090 | B1 | * | 11/2005 | Sciarra      | 340/573.1 |
| 7,990,274 | B2 | * | 8/2011  | Hill         | 340/573.3 |
| 2002/0109599 | A1 | * | 8/2002 | Aull       | 340/573.1 |
| 2003/0038720 | A1 | * | 2/2003 | Shugrue    | 340/568.1 |
| 2005/0139168 | A1 | * | 6/2005 | Light et al. | 119/721 |
| 2005/0217607 | A1 | * | 10/2005 | Light et al. | 119/721 |
| 2008/0036610 | A1 | * | 2/2008 | Hokuf et al. | 340/573.3 |
| 2008/0202446 | A1 | * | 8/2008 | Gross      | 119/720   |

* cited by examiner

*Primary Examiner* — George Bugg
*Assistant Examiner* — Ojiako Nwugo
(74) *Attorney, Agent, or Firm* — Andrew S. Langsam; Pryor Cashman LLP

(57) ABSTRACT

An electronic device and transmitter allowing animal owners to locate their animals by a non-verbal audible output signal and a visual output signal. A method for training animals to elicit a desired behavior based upon stimuli emitted from an electronic device. The electronic device and method enable animal owners to quickly find their animals that might not otherwise respond to verbal commands.

6 Claims, 4 Drawing Sheets

ELECTRONIC TRANSMITTER AND RECEIVER SYSTEM FOR TRAINING OF CATS AND OTHER DOMESTIC ANIMALS AND METHOD OF TRAINING DOMESTIC ANIMALS

CROSS-REFERENCE TO RELATED APPLICATION

This application is a continuation application of U.S. non-provisional patent application Ser. No. 11/938,244 filed Nov. 9, 2007 which is based on U.S. Provisional Patent Application Ser. No. 60/865,775 filed Nov. 14, 2006 and a claim to priority based thereon is respectfully made herein under 35 USC Section 119. The specification of those applications are incorporated herein by reference and claims to priority claimed.

FIELD OF THE INVENTION

The present invention relates to a device for locating an animal and methodology for training an animal to elicit a reinforced behavior in response to a stimulus.

DESCRIPTION OF THE RELATED ART

Animal owners are often confronted with the difficulty of locating their animals. Historically, numerous methods have been used, including brightly illuminated collars, bells and even clothing.

Numerous technologies have been employed to aid owners locating their animals. U.S. Pat. Nos. 5,036,610, 5,815,077, 6,003,473, 6,329,918, and 6,885,305 all disclose various means to solve this dilemma.

Fehr's U.S. Pat. No. 5,036,610 describes a central clearing house wherein the finder of a lost animal could call a phone number located on a collar or tag of an animal and obtain information based upon an additional, unique number also located on the collar. Using the unique number the finder of the animal could obtain the animal owners identity and contact information to secure the animal's safe return.

Christiansen's U.S. Pat. No. 5,815,077 describes an elaborate programmable hand held transmitter having a dual tone multiple frequency touch pad that can be used for voice communication with the animal and an electronic assembly attached to a collar strap mounted on the animal to be controlled. The electronic assembly includes a microprocessor/microcontroller which is used to supervise the functions performed by the collar assembly, having a radio signal receiver, a microprocessor, a sounder, a sound sensor, a motion sensor and an electroshock stimulator.

Printz's U.S. Pat. No. 6,003,473 describes a pet identification and retrieval device whereby finders of lost pets are able to listen to a prerecorded message concerning the pet's owners, as well as any additional information of relevance to the pet. This device further includes the identification tags and a low battery indicator light.

Moyer's U.S. Pat. No. 6,329,918 describes an electronic identification tag that allows pet owners to select, program and display information about the pet and its owner as a means for locating a lost pet. Additionally the tag emits audible signal reminding the pet's owner of such important events as a grooming, a veterinarian appointment, a feeding, or daily animal attention. This patent further contemplates a means for electronically summoning or paging an animal.

Davis' U.S. Pat. No. 6,885,305 describes a system for locating and sending messages to pets, wherein the messages are sent to pets using a hand-held remote transmitter and a receiver that is attached to the pet. The receiver has digitally recorded voice commands and one or more lights that can be turned on by pushing buttons on the transmitter.

There remains a need for a device that is simple to operate, yet effectively locates an animal by an audible and visual output. Furthermore, there is a need for a simple training method incorporating a device that elicits a response from an animal that might otherwise not respond to verbal commands.

SUMMARY OF THE INVENTION

The present invention relates to a system for locating a mobile animal by a human seeking the animal.

In one embodiment the system comprises: an electronic device adapted to be secured to the animal, the electronic device further comprising a receiver in communication with an emitter; a signal transmitter device adapted to be operated by the human to cause transmission of a signal from the signal transmitter to the receiver, with the receiver adapted to receive the signal from the signal transmitter device and responsively generate a non-verbal audible output signal such as a whistle or chime tone, and a visual output signal emanating from the emitter, the non-verbal audible output signal and the visual output signal being perceptible to the human, whereby the human is able to locate the animal.

In another embodiment, the current invention relates to a method of training an animal to respond to a stimulus, the method comprising the following steps:

securing an electronic device to the animal, the electronic device comprising a receiver in responsive communication with an emitter;

transmitting a signal from a transmitting device so that the signal is received by the receiver to generate a stimulus comprising an emitted non-verbal audible output and a visual output from the electronic device that is perceptible to the animal;

associating a reward for the animal with the emitted non-verbal audible output and the visual output emitted from the electronic device; and repeating the transmitting step and associating step to elicit a reinforced behavior from the animal in response to the repeated emitted non-verbal audible output and the visual output.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
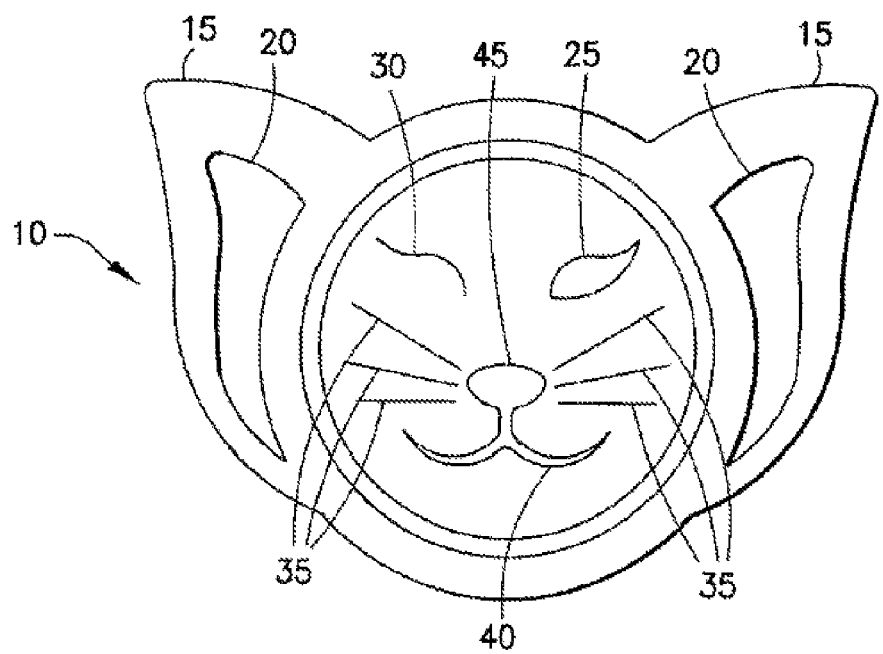
FIG. 1 is a front elevation view of one embodiment of the present invention showing a pendant or medallion including a receiver and emitter assembly, adapted for attachment to a collar.

The present invention relates to a system for locating a mobile animal by a human seeking the animal.

The system in one embodiment comprises: an electronic device adapted to be secured to the animal, the electronic device further comprising a receiver in communication with an emitter; a signal transmitter device adapted to be operated by the human to cause transmission of a signal from the signal transmitter to the receiver, with the receiver adapted to receive the signal from the signal transmitter device and responsively generate a non-verbal audible output signal and a visual output signal emanating from the emitter, the non-verbal audible output signal and the visual output signal being perceptible to the human, whereby the human is able to locate the animal.

In one aspect of the present invention, the non-verbal audible output signal comprises a beeping noise. In another aspect of the present invention the non-verbal audible output signal is a continuous tone. And, in yet another aspect of the present invention the non-verbal audible output signal comprises an intermittent tone or whistle. In a still further variation, the transmitter and receiver components of the system can be formed wholly or partially of material having a readily visualizable character. For example, these components may include a housing that is made of a fluorescent, phosphorescent, or other luminophoric material, whereby the housing glows in the dark, has a reflectance feature, or otherwise interacts with incident light or radiation to provide a distinctive visual signature.

In another embodiment of the present invention, the emitter further generates a visual output signal that includes a color selected from the group consisting of red, orange, yellow, green, blue, indigo, violet, pink, fuchsia, puce, chartreuse, and amber. In a preferred embodiment of the present invention, the visual output signal comprises a flashing light from one or more sources. In another preferred embodiment, the visual output signal emanates from one or more light emitting diodes. In yet another embodiment of the invention, the visual output signal comprises an intermittent light. In still another embodiment of the invention, the visual output signal comprises a continuous light.

In one aspect of the present invention, the electronic device comprises a pendant or medallion having dimensions of 0.5 to 3.0 inches in length, 0.5 to 3.0 inches in width, and 0.25 to 1.0 inches in depth. In a preferred embodiment of the current invention, the electronic device comprises a pendant having dimensions of 1.3 to 2.1 inches in length, 1.0 to 1.7 inches in width, and 0.2 to 0.9 inches in depth.

In one preferred embodiment of the current invention, the electronic device further comprises a pet and owner identification tag.

In one embodiment of the present invention, the electronic device comprises a housing member having a shape of an animal face. The animal face can be of any suitable type, as for example the visage of a cat, dog, rodent, bird, Siamese cat, Persian cat, tabby cat, poodle, dachshund, terrier, spaniel, beagle, chihuahua, ferret, rat, parakeet, parrot, toucan. In various embodiments, the animal face further comprises eyes, ears, nose, whiskers, and a mouth.

In a preferred embodiment of the present invention, one of the eyes is open and the other eye is closed. In another preferred embodiment, the eye that is open emits the visual output signal when the signal is received by the electronic device from the signal transmitter.

In another aspect of the present invention, the whiskers are slits that emit the non-verbal audible output signal. In another aspect of the present invention, the slits are covered with a water resistant membrane.

In another embodiment of the present invention the device is comprised of a front piece, a back piece and an intermediary piece sandwiched between the front and back piece. In yet another embodiment of the present invention the back piece has one or more eyelets for a pet collar to slide between, whereby the electronic device is adapted to be secured to the collar.

In a preferred embodiment the present invention relates to a method of training an animal to respond to a stimulus, the method comprises the following steps: securing an electronic device to the animal, the electronic device comprising a receiver in responsive communication with an emitter; transmitting a signal from a transmitting device so that the signal is received by the receiver to generate the stimulus that comprises an emitted non-verbal audible output and a visual output from the electronic device that is perceptible to the animal; and associating a reward for the animal with the emitted non-verbal audible output and the visual output emitted from the electronic device; and repeating the transmitting step and associating step to elicit a reinforced behavior from the animal in response to the repeated emitted non-verbal audible output and the visual output.

In another embodiment of the present invention the reward for the animal comprises food. In one embodiment of the present invention the reinforced behavior comprises the animal approaching the human. In another embodiment of the present invention the reinforced behavior comprises the animal moving to a predetermined location. In a preferred embodiment of the present invention the predetermined location is in close proximity to a food source.

FIG. 1 is a front elevation view of one embodiment of the present invention showing the entire pendant 10 attachable to a collar. This pendant 10 shows a feline face with outer ears 15, inner ears 20, whiskers 35, a nose 45, a mouth 40, one eye open 25 and one eye shut 30. In this embodiment the one open eye 25 comprises a light emitting diode to facilitate the visual output signal. The whiskers 35 are slits facilitating the emission of non-verbal audible output from the electronic device. In one embodiment the whiskers 35 have a water resistant membrane to protect the interior from water damage likely to occur if animals wear the electronic device outdoors.

In one embodiment the electronic device 10 and transmitter are constructed of plastic or polymeric material, and particularly, a non-metallic, non-impregnated with carbon or other material, so as not interfere with the receipt and transmission of an electronic signal. An ABS transparent plastic is one suitable material. The electronic circuitry of the transmitter and the electronic device are technologies that are well-established and often used in the field of remote actuation of mechanical devices. U.S. Pat. Nos. 4,866,433, 4,868,915, 4,897,644, and 3,891,980 are incorporated herein by reference as representative but by no means all-inclusive of the various remote actuated technologies that can be used to accomplish the signal transmission and signal reception of the present invention. In one embodiment the electronic device has a receiver frequency of between 400 to 500 MHz, a working voltage of 2 to 4 Volts, a static state working current of 1 to 2 mA, and a dynamic working current of 40 to 70 mA.

Figure 2:
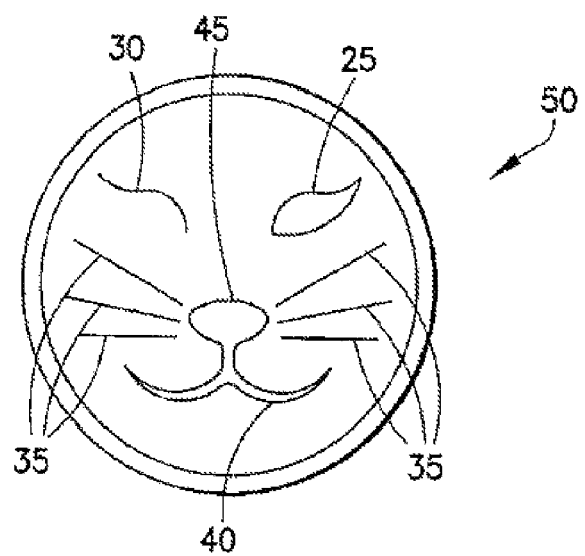
FIG. 2 is a front elevation view of the face portion of the pendant or medallion of FIG. 1.

FIG. 2 shows a front piece in one embodiment of the present invention. The front piece in this embodiment does not include ears but does include an open light emitting diode eye 25, a closed eye 30, nose 45, mouth 40, and whiskers 35 adapted to emit non-verbal audible output.

Figure 3:
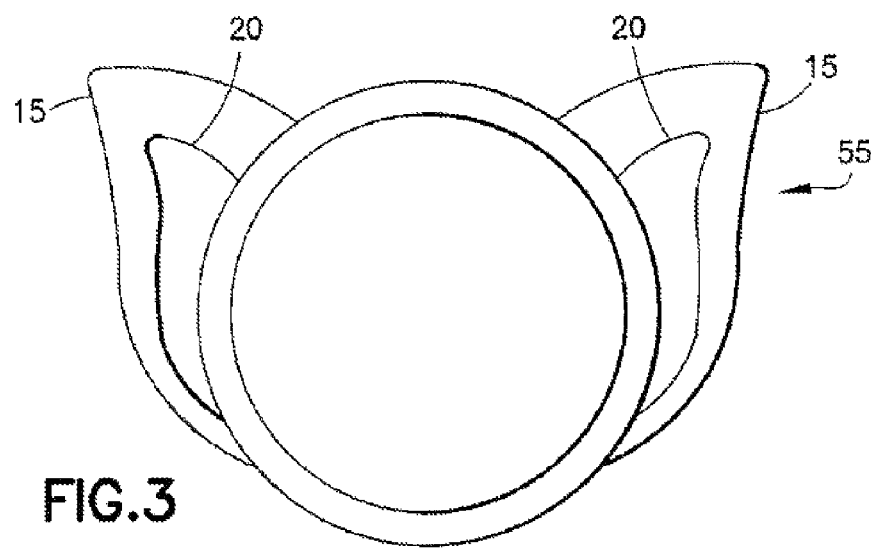
FIG. 3 is a front elevation view of the intermediate section of the pendant or medallion of FIG. 1.

FIG. 3 shows an intermediary piece 55 in one embodiment of the present invention. This intermediary piece has an outer ear 15 and inner ear portions 20.

Figure 4:
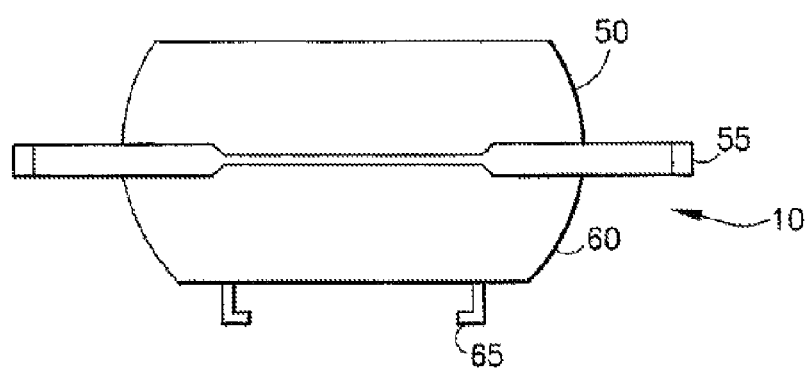
FIG. 4 is a top plan view of the pendant or medallion of FIG. 1.

FIG. 4 shows a three piece embodiment of an electronic device 10 of the present invention. The top piece 50 has an animal face in one embodiment of the present invention. In one embodiment of the present invention the face includes a flashing light for a visual output signal and slits for a non-verbal audible output signal. The intermediary piece 55 is sandwiched between the top piece and the bottom piece 60. The bottom piece 60 includes eyelets 65 adaptable to secure the electronic device 55 to a collar. This particular embodiment is not meant to limit the various means by which the electronic device may be secured to an animal.

Figure 5:
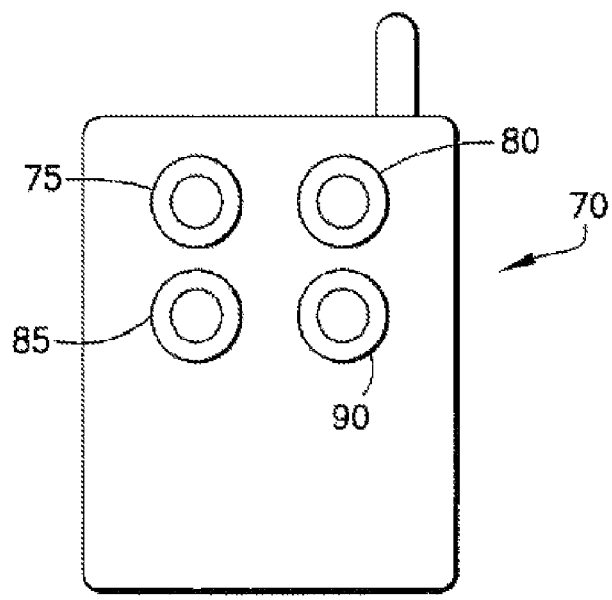
FIG. 5 is a front elevation view of a signal transmitter device according to one embodiment of the present invention for use with a pendant or medallion of the type shown in FIGS. 1-4.

FIG. 5 is a front view drawing of a signal transmitter device 70 according to one embodiment of the present invention. In this embodiment of a signal transmitter device buttons 75, 80, 85, and 90 may be pressed to cause transmission of various signals from the signal transmitter to the receiver of an electronic device. In other embodiments of the present invention additional or fewer buttons may be located on the signal transmitter device to send various signals to the electronic device. The various signals may correspond to various non-verbal audible output signals, visual output signals only or, alternatively, one or more non-verbal audible output signals only.

Figure 6:
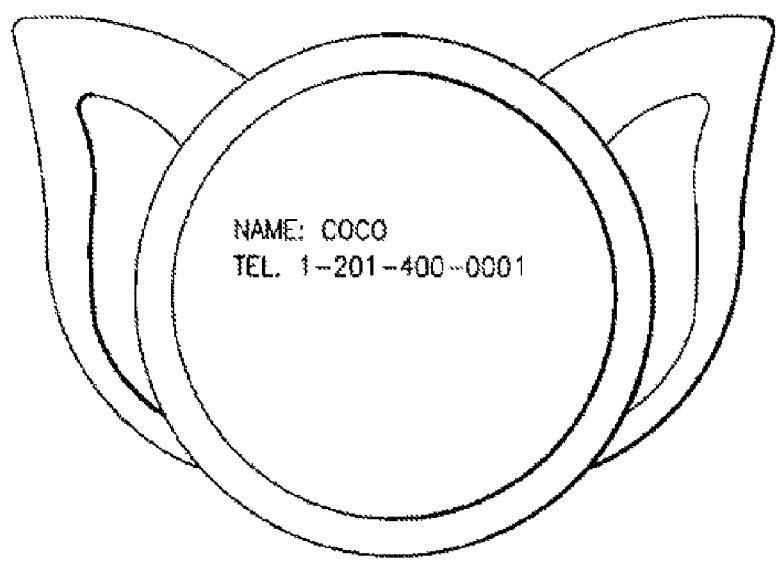
FIG. 6 is a rear elevation view of the pendant or medallion of FIG. 1.

FIG. 6 is a rear elevation view of a pendant or medallion of the type shown in FIG. 1, showing the rear surface of such pendant or medallion, as engraved or otherwise printed with the name of a pet intended to wear the pendant or medallion. Such rear surface also includes a telephone number of an owner of such pet, or number of other party to be notified in the event that the animal becomes lost, or is separated from its owner.

Figure 7:
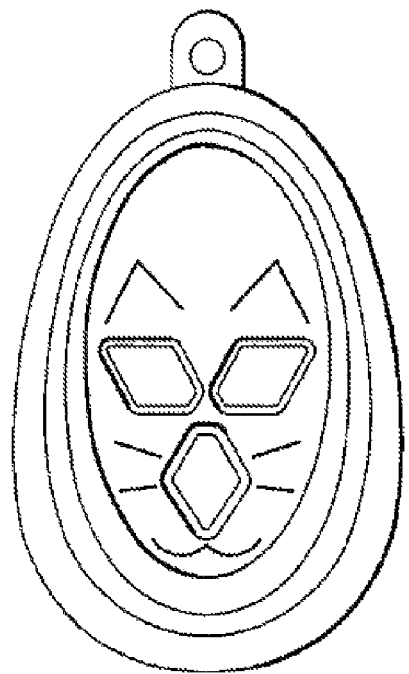
FIG. 7 is a front elevation view of a signal transmitter device according to another embodiment of the present invention for use with a pendant or medallion of the type shown in FIGS. 1-4.

FIG. 7 is a front elevation view of a signal transmitter device according to another embodiment of the present invention. The eyes and mouth of the fanciful face on such signal transmitter device comprise manually depressible buttons each of which can be selectively depressed to actuate a signal transmission to the receiver in the pendant or medallion on a pet, of the type shown and described in FIGS. 1-4. The "eye buttons" may each be actuated for signaling a different receiver worn by an individual one of a pair of pets. The "mouth button" may be arranged to emit a signal to the receiver of a third pet, or alternatively, such button may be used to actuate the other two buttons simultaneously.

Figure 8:
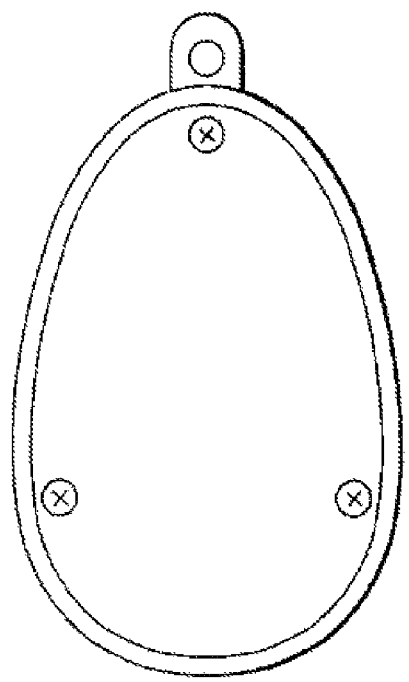
FIG. 8 is a rear elevation view of the signal transmitter device of FIG. 7.

FIG. 8 is a rear elevation view of the signal transmitter device of FIG. 7, showing the details of the casing, as secured with mechanical fastener elements, whereby the respective parts of the housing, comprising front and back sections, may be separated from one another for battery replacement, servicing, etc.

While the invention has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A method of training a mobile domestic animal by a human, the method comprising the following steps: securing an electronic receiver device to said domestic animal, said electronic receiver device comprising an electronic signal receiver, a non-verbal audible output signal generator and a visual output signal generator, both said non-verbal audible output signal generator and said visual output signal generator being in electronic communication with said electronic signal receiver; activating by a human the transmission of a wireless signal from a hand-held signal transmitter device and thus generating an electronic signal for detection and receipt by said receiver device; said receiver device generating, upon receipt of said electronic signal, both a non-verbal audible output signal and a visual output signal, the non-verbal audible output signal and the visual output signal both being perceptible to the animal; and providing and associating a positive or negative reward to the animal to be trained in response to the non-verbal audible output signal and the visual output signal; and repeating the activating, generating and providing steps to elicit a reinforced trained behavior from the animal in response to the non-verbal audible output and the visual output, all in response to the transmitted wireless signal.

2. A method as claimed in claim 1 wherein said positive or negative reward is food.

3. A method as claimed in claim 1 wherein said reinforced behavior is the action of the animal moving from one location to a second location.

4. A method as claimed in claim 1 wherein said reinforced behavior is the action of the animal moving towards the human.

5. A system for the training of a mobile domestic animal by a human comprising:
   an electronic receiver device adapted to be secured to the domestic animal, the receiver device comprising an electronic signal receiver, and a non-verbal audible signal and visual output signal emitter in electronic communication with said signal receiver which provides both a nonverbal audible output signal and a visual output signal in response to an electronic signal received by said signal receiver, both of said non-verbal audible output signal and said visual output signal being perceptible by said domestic animal;
   a hand-held wireless signal transmitter device adapted to be selectively activated by the human and capable of transmitting a wireless signal for detection by said receiver device, such that the animal can be trained to perform a particular step or steps based on the domestic animal's perception of said non-verbal audible output signal and said visual output signal in response to activation of said hand-held wireless signal transmitter.

6. A system as claimed in claim 5 wherein said hand-held wireless signal transmitter is provided with two or more unique wireless signals and two or more animals sought to be trained are each provided with a unique electronic receiver device.

* * * * *